(12) United States Patent
Renken et al.

(10) Patent No.: US 7,879,944 B2
(45) Date of Patent: Feb. 1, 2011

(54) PAINTABLE THERMOPLASTIC COMPOSITIONS

(75) Inventors: Andreas Renken, Geneva (CH); Georgios Topoulos, Meyrin (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 528 days.

(21) Appl. No.: 11/900,574

(22) Filed: Sep. 12, 2007

(65) Prior Publication Data

US 2008/0153984 A1 Jun. 26, 2008

Related U.S. Application Data

(60) Provisional application No. 60/845,853, filed on Sep. 20, 2006.

(51) Int. Cl.
*C08K 5/5415* (2006.01)
(52) U.S. Cl. .................................. 524/731; 525/479
(58) Field of Classification Search ................ 524/731; 525/479
See application file for complete search history.

(56) References Cited

U.S. PATENT DOCUMENTS

| 4,481,322 A | * | 11/1984 | Godlewski et al. .......... 524/265 |
| 6,048,946 A | | 4/2000 | Beisele |
| 2005/0186438 A1 | | 8/2005 | Alms et al. |

FOREIGN PATENT DOCUMENTS

| GB | 2 169 908 A | 7/1986 |
| JP | 2000-7848 | 1/2000 |

OTHER PUBLICATIONS

Patent Abstracts of Japan, 2000007848, Nov. 1, 2000, Nippon Unicar Co Ltd.
Patent Abstracts of Japan, 2000001620, Jul. 1, 2000, Toto Ltd.

* cited by examiner

*Primary Examiner*—Kuo-Liang Peng
(74) *Attorney, Agent, or Firm*—Loretta Smith

(57) ABSTRACT

Thermoplastic compositions which are painted (coated) have improved adhesion to the paint when these compositions comprise a hydrophilic polyether or polyester modified siloxane. These thermoplastic compositions are particularly suited for use with aqueous based paints, in uses such as automobile and appliance bodies and parts.

11 Claims, No Drawings

PAINTABLE THERMOPLASTIC COMPOSITIONS

CROSS REFERENCE TO RELATED APPLICATIONS

This application claims the benefit of U.S. Provisional Application No. 60/845,853, filed Sep. 20, 2006.

FIELD OF THE INVENTION

Thermoplastic compositions with improved paint adhesion comprise a hydrophilic polyester or polyether modified siloxane.

TECHNICAL BACKGROUND

Thermoplastics are ubiquitous in modern life, being used for a myriad of purposes. Among these uses are packaging, mechanical parts, electrical and electronic apparatus parts, appliance parts, vehicle and automotive parts, toys, furniture, tanks, etc. In some cases, often for improved or distinctive appearance, and/or to match painted metal parts, the thermoplastic parts are painted (coated) using various types of paints (coatings). These paints may be applied in a number of conventional ways, for instance brush, spray or immersion coating.

One problem often encountered in painting thermoplastics is the (often poor) adhesion of the paint to the thermoplastic. Most paints are organic polymers, or form polymer upon curing, and the polymers used in the paints are usually different than the thermoplastic being coated. It is well known in the art that different types of polymers are usually incompatible with one another and often have poor adhesion to one another. Additives are often added to the paints to improve paint adhesion. However these additives sometimes adversely affect properties of the paint or cannot be used in specific cases where surfaces to be painted with the same coating are of different nature for example plastic surfaces side-by-side to metal surfaces as in automotive exteriors. It is therefore desired to develop a method to improve paint adhesion by modifying the thermoplastic composition, thus not adversely affecting other properties of the paint system.

A data sheet for "Dow Corning® 57 Additive", which is reported to be a polyether modified siloxane states that it is a useful additive in coatings and paints to improve leveling, reduce coefficient of friction, mar resistance, and enhance gloss. Nothing is stated about improved adhesion to a substrate, nor about adding this material to a thermoplastic to improve adhesion of a paint.

SUMMARY OF THE INVENTION

This invention concerns a composition, comprising, a thermoplastic and about 0.05 percent to about 5.0 percent by weight of a hydrophilic polyether or polyester modified siloxane, wherein said percent by weight is based on the total weight of the composition.

This invention also concerns a process for the painting of a thermoplastic composition with a paint, wherein the improvement comprises said thermoplastic composition comprises a thermoplastic and about 0.05 percent to about 5.0 percent by weight of a hydrophilic polyether or polyester modified siloxane, wherein said percent by weight is based on the total weight of composition.

Also disclosed herein is an item comprising a thermoplastic composition wherein said thermoplastic composition comprises a thermoplastic and about 0.05 percent to about 5.0 percent by weight of a hydrophilic polyether or polyester modified siloxane, wherein said percent by weight is based on the total weight of said composition, and provided that at least part of a surface of said thermoplastic composition is painted.

DETAILS OF THE INVENTION

Herein certain terms are used and some of them are defined below.

By a thermoplastic is meant a polymeric material which when heated becomes a liquid (although often very viscous) and may flow. The thermoplastic may be a (semi)crystalline thermoplastic which has a melting point or an amorphous thermoplastic which has a glass transition temperature. As is normal for thermoplastics one or both of the melting point (if present) and glass transition temperature are above ambient temperature, about 30° C., more preferably above about 70° C. Melting points and glass transition temperatures are measured by method ASTM Method D3418. Melting points are taken as the maximum of the melting endotherm, and glass transition temperatures are taken as the midpoint of the transition. Melting points and glass transition temperatures are measured on a second heat.

By a thermoplastic composition is meant a composition containing one or more thermoplastics in which the thermoplastic(s) is the continuous phase. The thermoplastic composition is preferably greater than 0.5 mm thick and/or is self supporting. Therefore it is preferably not a thin layer or a flexible film.

By a siloxane is meant a compound (or mixture of compounds such as a polymer) in which there are at least (on average for oligomers and polymers) three silicon siloxane atoms in the compound. By a silicon siloxane atom is meant a silicon atom bound to an oxygen atom and the other bond to that oxygen atom is also bound directly to a silicon atom. Examples of siloxanes include

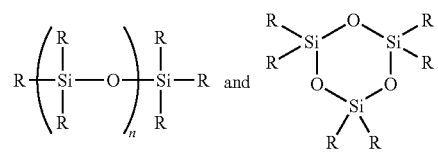

wherein n is two or more (also on average in an oligomer or polymer), and R is independently a generalized group such as a hydrocarbyl, substituted hydrocarbyl, hydrogen, halogen, alkoxy, etc. Preferably in the siloxane each R group (except for polyether or polyester groups, see below) is relatively chemically inert, more preferably hydrocarbyl or substituted hydrocarbyl, especially preferably hydrocarbyl, more preferably alkyl, and very preferably methyl.

By an polyether or polyester substituted siloxane (PESO) is meant a siloxane in which one or more of the groups (for example the "R" groups above) is a hydrophilic polyether or polyester group, respectively. By a polyether group is meant a group containing two or more ether oxygen atoms (ether linkages) or two or more ester groups, preferably at least about 5 ether or ester groups, and more preferably at least about 10 ether or ester groups per polyether or polyester group respectively.

Preferably the polyether or polyester group is attached to the siloxane directly through a bond from a carbon atom of the polyether or polyester group. For instance a polyether group containing polysiloxane may be made according to Scheme 1 wherein PE is a polyether group (catalysts and some reagents not shown):

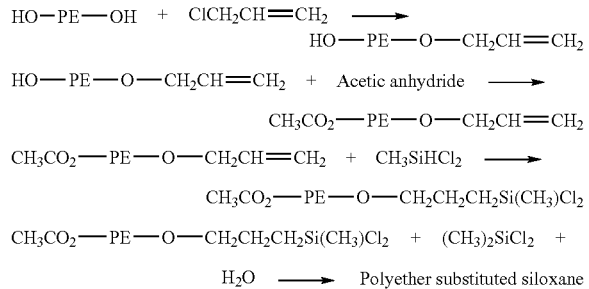

Scheme 1

A preferred hydrophilic polyether is poly(ethylene oxide), which of course would have some type of reactive group so it could eventually be attached to the siloxane. For example in Scheme 1 above the "original" polyether may be in the form of poly(ethylene oxide) diol.

Although Applicant does not wish to be bound by any particular theory, it is believed that in part the PESO improves adhesion to coatings (paints) by (partially) migrating the surface of the thermoplastic composition and while at the surface improving the adhesion between the thermoplastic composition and the coating. Therefore it is preferred that the PESO not be of very high molecular weight since such migration (presumably by diffusion through the thermoplastic composition) will be slower the higher the molecular weight of the PESO. It is also important that the PESO not be of too low a molecular weight that it is volatilized by heating if the painting process involves heating.

Sometimes a particular PESO may improve paint adhesion for one type of thermoplastic but not another. This may be due to the wrong balance in the PESO between hydrophilic and hydrophobic segments and/or the molecular weight of the PESO. Simple experimentation will determine whether paint adhesion is improved with any particular combination and amount of PESO and thermoplastic, for instance see the Examples.

The amount of the PESO in the composition is about 0.05 to about 5.0 weight percent, preferably about 0.5 to about 4.0 weight percent, more preferably about 0.8 to about 3.0 weight percent. All weight percents are based on the total weight of the ingredients in the composition. It is to be understood that in the weight ranges above any maximum amount can be combined with any minimum amount to form a "new" preferred range.

Other materials may also be present in the PESO containing compositions herein to improve various physical properties or other aspects of the composition. Such materials may include one or more of fillers, reinforcing agents, lubricants, antioxidants, impact modifiers (tougheners), brightening agents, mold release agents, nucleating agents, hydrolytic stabilizers, plasticizers, and UV stabilizers. In one form it is preferred that the composition contain about 10 to about 55 weight percent of fillers and/or reinforcing agents, more preferably about 55 to about 50 weight percent of these materials, based on the total weight of the composition. Reinforcing agents and/or fillers include fibrous materials such as chopped glass fibers, milled glass fibers, aramid fibers, wollastonite, titanium dioxide whiskers, and powders (particulates) such as $TiO_2$, mica, clays, calcium sulfate, calcium phosphate, barium sulfate, talc, glass beads and glass flake.

Useful thermoplastics include: poly(oxymethylene) and its copolymers; polyesters such as PET, poly(1,4-butylene terephthalate), poly(1,4-cyclohexyldimethylene terephthalate), and poly(1,3-poropyleneterephthalate); polyamides such as nylon-6,6, nylon-6, nylon-12, nylon-11, and aromatic-aliphatic copolyamides; polyolefins such as polyethylene (i.e. all forms such as low density, linear low density, high density, etc.), polypropylene, polystyrene, polystyrene/poly(phenylene oxide) blends, polycarbonates such as poly(bisphenol-A carbonate); fluoropolymers including perfluoropolymers and partially fluorinated polymers such as copolymers of tetrafluoroethylene and hexafluoropropylene, poly(vinyl fluoride), and the copolymers of ethylene and vinylidene fluoride or vinyl fluoride; polysulfides such as poly(p-phenylene sulfide); polyetherketones such as poly(ether-ketones), poly(ether-ether-ketones), and poly(ether-ketone-ketones); poly(etherimides); acrylonitrile-1,3-butadinene-styrene copolymers; thermoplastic (meth)acrylic polymers such as poly(methyl methacrylate); thermoplastic elastomers such as the "block" copolyester from terephthalate, 1,4-butanediol and poly(tetramethyleneether)glycol, and a block polyolefin containing styrene and (hydrogenated) 1,3-butadiene blocks; and chlorinated polymers such as poly(vinyl chloride), vinyl chloride copolymer, and poly(vinylidene chloride). Polymers which may be formed in situ, such as (meth)acrylate ester polymers are also included. Blends of thermoplastics may be used, including blends of any of two or more of the above mentioned thermoplastics. Preferred thermoplastics are polyolefins, polyamides, polyesters, and blends comprising any of an acrylonitrile-1,3-butadinene-styrene copolymer, and a poly(phenylene oxide) polymer.

The paints (coatings) used may be of any type, water borne or organic solvent borne. Preferred coatings are water borne. They may be a lacquer-type coating that does not cure, a coating that cures at room temperature, or a coating that normally requires elevated temperatures to cure. The coating may be clear or pigmented. The coating may be applied in any conventional manner, for instance rolled on, brushed on, sprayed on (with or without electrostatic assistance), or coated by immersion in the a liquid coating or by immersion in a fluidized bed.

It is to be understood that it may be desirable to coat the PESO containing thermoplastic part with more than one layer of coating. In such a case the first coating (paint) layer applied will be applied to the PESO containing thermoplastic part, and subsequent layers will be applied on top of that first coating layer. Such multiply coated parts are included within the definition of parts coated with the present PESO containing composition.

The thermoplastic compositions to be painted may be prepared and shaped by methods usually used for the particular type of resin used. For instance thermoplastics may be melt mixed with the various ingredients that make up the composition in typical melt mixing types of apparatus, such as single and twin screw extruders, and kneaders. After formation of the thermoplastic composition it may be formed into a part by typical melt forming methods, for instance injection molding, blow molding, rotomolding, or extrusion. Other common methods forming methods such as thermoforming may also be used.

The PESO containing thermoplastic composition may be used wherever is necessary and/or desirable to paint (coat) thermoplastic which is, or is a component of, an apparatus or item. For instance items such as automobiles or automobile components such as body panels (quarter panels, hoods, trunk lids, roofs, bumpers, dashboards, interior panels, interior trim parts, gas caps, and wheel covers), appliances including components such as lids, covers, bodies, and panels, power tool housings, boxes and housings for various electronic products such as computers, keyboards, monitors, printers, television sets, radios, telephones including portable and cell phones, toys, furniture, sporting goods such as skis, snowboards, skate boards, containers for cosmetic articles, may be made from the present thermoplastic composition so they may be painted (coated) before sale. While thermoplastics may have molded-in colors, glossy and/or vibrant colors are often best obtained using paints/coatings.

The PESO containing compositions described herein are especially useful for coatings which are heated after application to fully "set" them, such as most OEM coatings for appliances and automotive vehicles such as cars, trucks, farm machinery, and snowmobiles. These often require heating to relatively high temperatures for short periods of times to achieve optimum coating appearance and physical properties. Such coating processes, common in the automotive and appliance industries, are described in Published US Patent Application 20050186438, which is hereby included by reference.

Compounding and Molding Methods "Side fed" means those ingredients were mixed and fed in the side of the extruder, while "rear fed" means those ingredients were mixed and fed into the rear of the extruder. The mixing of the ingredients before being fed to an extruder was usually by tumble mixing.

Compounding Method A Polymeric compositions were prepared by compounding in 40 mm Berstorf twin screw extruder. All ingredients were blended together and added to the rear (barrel 1) of the extruder except that Nyglos® and other minerals (including carbon black) were side-fed into barrel 4 (of 8 barrels) and the plasticizer was added using a liquid injection pump. Any exceptions to this method are noted in the examples. Barrel temperatures were set at 280-310° C. resulting in melt temperatures 290-350° C. depending on the composition and extruder rate and rpm of the screw.

Compounding Method B This was the same as Method A except a 40 mm Werner and Pfleiderer twin screw extruder was used. The side-fed materials were fed into barrel 5 (of 10 barrels). The modified PDMS were either dripped into Barrel 1 using a liquid pump or injected in a spacer plate between barrel 5 and 6

Resins were molded into 130×130×3 mm test specimens on a 175 ton injection molding machine. Barrel temperature were 300-310° C., melt temperatures were 300-305° C., mold temperatures were 120-130° C.

In the Examples certain ingredients are used, and they are defined below:

CB1—Ketjenblack® EC600JD, a conductive carbon black from Akzo Nobel Polymer Chemicals, LLC, Chicago, Ill. 60607 USA Dow 57: Dow Corning® 57 Additive, a "Dimethyl, methyl (polyethylene oxide acetate capped) siloxane" available from Dow Corning Corporation, Midland, Mich. 48686-0994, USA.

HTN® FE350006: A copolymer of 1,6-hexanediamine, 2-methyl-1,5-pentanediamine and terephthalic acid, mineral reinforced and impact modified, available from E.I. DuPont de Nemours & Co., Inc., Wilmington, Del. 19898, USA PET RT49—poly(ethylene terephthalate) (PET) homopolymer, inherent viscosity=0.67, available from Invista, Wichita, Kans. 67220, USA.

Novapex GG500—PET homopolymer, available from Mitsubishi Chemical Corp., Tokyo 108-0014 Japan.

Irganox® 1010—antioxidant available from Ciba Specialty Chemicals, Tarrytown, N.Y. 10591, USA.

LCP5-50/50/70/30/320 (molar parts) hydroquinone/4,4'-biphenol/terephthalic acid/2,6-napthalene dicarboxylic acid/4-hydroxybenzoic acid copolymer, melting point 334° C.

Licowax® PE 520—a polyethylene wax used as a mold lubricant available from Clariant Corp. Charlotte, N.C. 28205, USA. It is reported to have an acid value of 0 mg KOH/g wax.

Nyglos® 4—average approximately 9 μm length wollastonite fibers with no sizing available from Nyco Minerals, Calgary, AB, Canada.

Plasthall® 809—polyethylene glycol 400 di-2-ethylhexanoate.

Polymer D—ethylene/n-butyl acrylate/glycidyl methacrylate (66/22/12 wt. %) copolymer, melt index 8 g/10 min.

Tegomer®5845—hydrophilic polyether modified PDMS available from Goldschmidt GmbH, 45127 Essen, Germany.

Tegopren® 5851—hydrophilic polyether modified poly (dimethylsiloxane) (PDMS) available from Goldschmidt GmbH, 45127 Essen, Germany.

Vansil® HR 325—wollastonite from R.T. Vanderbilt Co., Norwalk, Conn. 06850, USA.

In the Examples, all compositional amounts shown are parts by weight.

Painting Process (Examples 1-4 and Comparative Examples A-B). Test pieces having dimensions 130×130×3 mm were cleaned using isopropanol and baked for 30 min at 190° C. to simulate typical e-coat baking temperatures. Subsequently, a waterborne primer surfacer (Titanium Silver Hydrofüller® 131-79039-00 from Hemmelrath Lackfabrik GmbH, Klingenberg, Germany) was electrostatically sprayed onto the surface using a Dürr Ecobell® atomizer (Dürr AG, Bietigheim, Germany) and the test pieces were dried horizontally at 80° C. for 10 min and then 160° C. for 20 min. The test pieces were let to cool down to room temperature and a waterborne base coat (Titansilber® FW60/911W from BASF AG, Ludwigshafen, Germany) was electrostatically applied on the primer surfacer layer using a Dürr Ecobell® atomizer. The base coat was dried at 80° C. for 10 min and then cooled to room temperature. Then a solvent borne 2K clear coat (2K Clear 40496.0 from DuPont Performance Coatings GmbH Co. KG, Wuppertal, Germany) was applied using a Dürr Ecobell® atomizer and dried at 145° C. for 20 min.

Example 5 and Comparative Example C: Test pieces having dimensions 120×120×3 mm, were sprayed without any pre-treatment with waterborne basecoat Cromax® from E.I. DuPont de Nemours & Co., Inc, Wilmington, Del. 19898 USA. The test pieces were dried. Then a two component clearcoat system, Chromaclear® 3200S with low emission activator XK205, both also from DuPont was sprayed over the primer.

Paint Adhesion Tests. Paint adhesion was determined on test plaques 130×130×3 mm painted as described above. The cross-cut test was done α-cording to ISO Method 2409. A result of "0" indicates that no paint came off the surface during the test and that paint adhesion was excellent. Values of below "2" are satisfactory on a scale of 0 to 5. Stone chip paint adhesion was evaluated according to VDA Standard 621-427 (of the German Automakers Association); again a value of "0" indicates that no paint came off the surface of the sample. Satisfactory values are "2" or below on a scale from 0 to 10. In both tests a maximum value means all or almost of the paint was removed. The results are summarized in Table 1.

Surface Tension measurements: Surface tension was measured on the test specimens according to DIN Method 53364 as painted just after molding (without pretreatment or IPA wiping), and after IPA wipe and 30 min at 190° C. to simulate typical on-line painting processes (examples 1-4 and Comparative Examples A-B). The results are reported in Table 1 in mN/m.

Examples 1-5 and Comparative Example A-C

Example 1 Comparative Example A were mixed by Method A, Examples 2-4 and Comparative Example B were mixed by Method B, whereas for Example 5 ingredients were dry-blended by hand. All materials were molded using the standard injection molding procedure. Results are give in Table 1.

TABLE 1

| | Example | | | | | | | |
|---|---|---|---|---|---|---|---|---|
| | A | 1 | 2 | 3 | 4 | B | 5 | C |
| Dry-blended ingredients | | | | | | | | |
| HTN ® FE350006 | | | | | | | 98 | 100 |
| Tegomer ® 5845 | | | | | | | 2 | |
| Rear Fed | | | | | | | | |
| PET RT49 | 73.5 | 71.5 | | | | | | |
| Novapex ® GG500 | | | 73.2 | 72.2 | 72.2 | 74.2 | | |
| LCP5 | | | 2.5 | 2.5 | 2.5 | 2.5 | | |
| Polymer D | 15 | 15 | 11 | 11 | 11 | 11 | | |
| Irganox ® 1010 | 0.3 | 0.3 | 0.3 | 0.3 | 0.3 | 0.3 | | |
| Licowax ® PE 520 | 0.5 | 0.5 | 0.5 | 0.5 | 0.5 | 0.5 | | |
| Dow Corning ® 57 | | | 1 | 2 | | | | |
| Tegopren ® 5851 | | 2 | | | | | | |
| Side Fed | | | | | | | | |
| CB1 | 2.5 | 2.5 | 2.5 | 2.5 | 2.5 | 2.5 | | |
| Nyglos ® 4 | 5.2 | 5.2 | | | | | | |
| Vansil ® HR325 | | | 6 | 6 | 6 | 6 | | |
| Injected Barrel 5-6 | | | | | | | | |
| Dow Corning ® 57 | | | | | 2 | | | |
| Injected Barrel 10 | | | | | | | | |
| Plasthall ® 809 | 3.0 | 3.0 | 3.0 | 3.0 | 3.0 | 3.0 | | |
| Paint adhesion - Cross-Cut | 5 | 0 | 0 | 0 | 1.5 | 5 | 0.5 | 5 |
| Paint adhesion - Stone-chip | | | 2 | 1 | 1 | 5 | | |
| Surface Tension as molded | 40 | 40 | 32 | 32 | 32 | 32 | 32 | 40 |
| Surface Tension after IPA wipe and 30 min @190° C. | 38 | 48 | 44 | 42 | 42 | 34 | | |

What is claimed is:

1. A painted article comprising a thermoplastic composition comprising:
   (i) a thermoplastic selected from the group consisting of poly(oxymethylene) and its copolymers, polyesters, polyamides and aromatic-aliphatic copolyamides, polycarbonates, polysulfides, polyether-ketones, poly(etherimides), acrylonitrile-1,3-butadiene-styrene copolymers, thermoplastic (meth)acrylic polymers, and a thermoplastic elastomer which is a block copolyester from terephthalate, 1,4-butanediol and poly(tetramethyleneether)glycol, and blends of these; and
   (ii) about 0.05 percent to about 5.0 percent by weight of the total weight of the composition of a hydrophilic polyether or polyester modified siloxane,
   wherein the paint adhesion of the painted article is a value below 2 as determined by ISO Method 2409, or a value of 2 or below on a scale from 0 to 10 according to VDA Standard 621-427.

2. The article as recited in claim 1 wherein said percent by weight is about 0.8 percent to about 3.0 percent.

3. The article as recited in claim 1 wherein said modified siloxane contains said polyether group which is poly(ethylene oxide).

4. The article as recited in claim 1 which is an automobile component.

5. The article as recited in claim 1 which is or is part of an appliance component, a power tool housing, a box or housing for an electronic product, a toy, furniture, sporting goods, or a container for cosmetic articles.

6. A process for improving paint adhesion of a painted surface of a thermoplastic composition, comprising:
   painting a thermoplastic composition,
   wherein the thermoplastic composition comprises:
   (i) a thermoplastic selected from the group consisting of poly(oxymethylene) and its copolymers, polyesters, polyamides and aromatic-aliphatic copolyamides, polycarbonates, polysulfides, polyether-ketones, poly(etherimides), acrylonitrile-1,3-butadiene-styrene copolymers, thermoplastic (meth)acrylic polymers, and a thermoplastic elastomer which is a block copolyester from terephthalate, 1,4-butanediol and poly(tetramethyleneether)glycol, and blends of these; and (ii) about 0.05 percent to about 5.0 percent by weight of the total weight of the composition of a hydrophilic polyether or polyester modified siloxane wherein the paint adhesion of the painted surface of the thermoplastic composition comprising (ii) is a value below 2 as determined by ISO Method 2409, or a value of 2 or below on a scale from 0 to 10 according to VDA Standard 621-427.

7. The process as recited in claim 6 wherein said percent by weight is about 0.8 percent to about 3.0 percent.

8. The process as recited in claim 6 wherein said modified siloxane contains said polyether group which is poly(ethylene oxide).

9. The process as recited in claim 6 wherein said paint is water borne.

10. The process as recited in claim 6 wherein said thermoplastic composition is an automobile component.

11. The process as recited in claim 6 wherein said paint was water borne during application.

* * * * *

UNITED STATES PATENT AND TRADEMARK OFFICE
CERTIFICATE OF CORRECTION

| | | |
|---|---|---|
| PATENT NO. | : 7,879,944 B2 | Page 1 of 1 |
| APPLICATION NO. | : 11/900574 | |
| DATED | : February 1, 2011 | |
| INVENTOR(S) | : Andreas Renken et al. | |

It is certified that error appears in the above-identified patent and that said Letters Patent is hereby corrected as shown below:

Title Page, column 1, Section (60) should read as follows

(60) Provisional application No. 60/845,853, filed on September 20, 2006, and Provisional Application No. 60/845,920, filed on September 20, 2006.

Signed and Sealed this
Fifth Day of July, 2011

David J. Kappos
*Director of the United States Patent and Trademark Office*